United States Patent [19]

Preisser

[11] Patent Number: 4,906,330

[45] Date of Patent: Mar. 6, 1990

[54] PROCESS FOR THE DISPOSAL OF HARDENING-SHOP WASTEWATERS

[75] Inventor: Friedrich Preisser, Buedingen, Fed. Rep. of Germany

[73] Assignee: Degussa Aktiengesellschaft, Frankfurt, Fed. Rep. of Germany

[21] Appl. No.: 291,624

[22] Filed: Dec. 29, 1988

[30] Foreign Application Priority Data

Jan. 6, 1988 [DE] Fed. Rep. of Germany ....... 3800143

[51] Int. Cl.$^4$ ............................................. B01D 1/14
[52] U.S. Cl. ................................. 159/47.3; 159/16.1; 159/DIG. 6; 203/10; 203/12; 203/49; 203/100
[58] Field of Search .............. 159/47.3, 47.1, DIG. 6, 159/16.1; 203/10, 12, 49, DIG. 17, 100

[56] References Cited

U.S. PATENT DOCUMENTS

| | | | |
|---|---|---|---|
| 1,284,218 | 11/1918 | Benjamin | 159/DIG. 6 |
| 2,042,145 | 5/1936 | Darrah | 159/DIG. 6 |
| 2,343,666 | 3/1944 | Hickman et al. | 159/DIG. 6 |
| 2,419,875 | 4/1947 | Birdseye | 159/DIG. 6 |
| 3,565,767 | 2/1971 | Light | 159/16.1 |
| 3,870,585 | 3/1975 | Kearns et al. | 159/DIG. 6 |
| 3,970,511 | 7/1976 | Rat et al. | 159/DIG. 6 |
| 4,465,554 | 8/1984 | Glass | 159/16.1 |
| 4,800,252 | 1/1989 | Steixner | 159/DIG. 6 |

FOREIGN PATENT DOCUMENTS 0563945 9/1944 United Kingdom ......... 159/DIG. 6

Primary Examiner—Virginia Manoharan
Attorney, Agent, or Firm—Beveridge, DeGrandi & Weilacher

[57] ABSTRACT

Hardening-shop wastewaters can be removed without salt incrustations and without creating harmful exhaust steam during the evaporation of the wastewaters only if the heat is supplied across the free liquid surface to temperatures of 50° C. to 85° C. and a flow of air is conducted across the free liquid surface.

4 Claims, No Drawings

PROCESS FOR THE DISPOSAL OF HARDENING-SHOP WASTEWATERS

The present invention relates to a process for the disposal of hardening-shop wastewaters, in particular of hardening-shop wastewaters with high cyanide and/or cyanate charges by evaporation of the liquid in a container and removal of the residue left behind.

The term "hardening-shop wastewaters" refers to saliferous flushing waters. After the heat treatment or thermochemical salt-bath treatment of steels, such as, for example carburizing, nitrocarburizing, annealing or tempering, steel charges are cleaned with water in order to remove the treatment salts, which have a corrosive action if oxygen is admitted. In hardening shops, the flushing waters from various treatment processes are usually led together into a common stream. These mixed wastewaters must, however, be subjected to a suitable treatment, in order to free them of the salt charge and, in part, of toxic constituents before they may be introduced into the sewerage network.

Chemical and physical processes of wastewater treatment are known. In chemical treatment, the water is neutralized by means of chemical additives, and parts of the salt charge are precipitated as constituents that are difficult to dissolve. In physical processes, the water is evaporated and the brines left behind are removed or are oxidized to innocuous products by chemical means.

It is common practice to evaporate flushing waters in a crucible furnace or special distillers. Since hardening-shop salts consist chiefly of chlorides and carbonates, these products crystallize preferentially on the walls of the containers. The salt crystals adhere firmly to the walls (incrustation), so that they are very difficult to remove. At the same time, they have an insulating action, so that they diminish the heat flux from the heat-transfer medium to the wastewater being evaporated. Therefore, in the present state of the art, the temperature of the distiller, e.g., of the crucible, is continuously raised until the melting point of the mixed salts is exceeded (typically 250° C.–400° C.) for the removal of salts. The molten mixed salt is then drained off.

The drawback of this process is that, with rising temperature, especially in the case of cyanide-containing wastewaters, chemical reactions occur in the brine. These reactions produce hydrocyanic acid and ammonia, which are carried away from the distiller by the vapor.

It is also common practice to introduce the hardening-shop wastewaters into a salt melt at temperatures between 300° and 400° C. The water content evaporates and the toxic constituents of the brine are chemically bound by the receiving salt (usually by oxidation, e.g., of cyanides into carbonates). Disadvantages, again, is the enrichment of the vapor with hydrocyanic acid and ammonia, both as aerosol and as gas. The aerosol charge in this process is high, since the large temperature difference between salt melt and inlet wastewater leads to very active evaporation, and the required chemical reaction between receiving salt and mixed salt in the wastewater does not go to completion.

SUMMARY OF THE INVENTION

It was therefore the main object of the present invention to provide a process for the disposal of hardening-shop wastewaters, in particular of hardening-shop wastewaters with a high cyanide and/or cyanate charge by evaporation of the liquid in a container and removal of the residue left behind, wherein the vapor is free of toxic gases and the residues left behind can easily be removed from the container.

In accordance with the invention, this and other objects are achieved by supplying the heat for evaporation over the free liquid surface, during which it is necessary to keep the temperature in a roughly 5-mm surface layer of the liquid at 50° to 85° C., and by conducting across the free liquid surface a flow of air, whose water-vapor-absorbing capacity is greater than the quantity of vapor released by the heat supplied.

DESCRIPTION OF SPECIFIC EMBODIMENTS

Flat troughs are preferably used for carrying out the process, above which sheet-like sources of infrared radiation are placed some distance away. The distance from liquid surface to radiation source is, for example, 200 to 400 mm with a radiant power per unit area of approximately 20 kW/m$^2$. Water is driven off by evaporation at the surface, during which the crystallizing salt particles precipitate on the relatively cold bottom of the trough, where they can easily be removed without incrustations. The radiant power per unit area is to be selected such that only controlled evaporation takes place. In this way, a constant wastewater temperature of, for example, approximately 70° C. sets in, at which temperature chemical decomposition reactions are negligible and HCN and NH$_3$ are prevented from escaping.

Ambient air is drawn across the liquid surface and absorbs the escaping water vapor. The quantitative air flow rate is calculated such that the water-vapor absorbing capacity is substantially greater than the quantity of vapor released by the infrared radiant power. In this way, the vaporating capacity of the plant is independent of fluctuations in the relative humidity of the ambient air. For the power data cited above, a volumetric flow rate of 700 m$^3$(STP)/h—m$^2$ to 1200 m$^3$(STP)/h·m$^2$ has proved suitable.

The salt sediment can be readily removed as a pasty pulp and charged, for example, into old salt drums. The residue from evaporation does not form a crust, since the salt is produced exclusively through gravity sedimentation and the water content in the sediment is relatively high. The salt crystals are therefore easy to separate from the bottom of the container.

The process in accordance with the invention is independent of the salt content and the composition of the hardening-shop wastewater; pollutant-free off vapors are continuously formed and can be released into the ambient air without post-treatment.

I claim:

1. A process for the disposal of hardening-shop wastewaters with high cyanide or cyanate charges or mixtures thereof comprising evaporation wastewater in a container and removing any residue left behind; supplying the heat for evaporation over a free wastewater surface, during which the temperature is kept in approximately a 5-mm surface layer of the liquid wastewater at 50 to 85° C. and conducting across the liquid wastewater surface a flow of air whose water vapor-absorbing capacity is greater than the quantity of vapor released by heat supplied, wherein the heat is supplied by a source of infrared radiation.

2. The process according to claim 2 wherein the evaporation is carried-out in a trough container.

3. The process according to claim 2 wherein the infrared radiation is about 200 to 400 mm above the liquid surface.

4. The process according to claim 3 wherein the radiant power per unit area is 20 kw/M$^2$ to furnish the heat.

* * * * *